Figure 1:
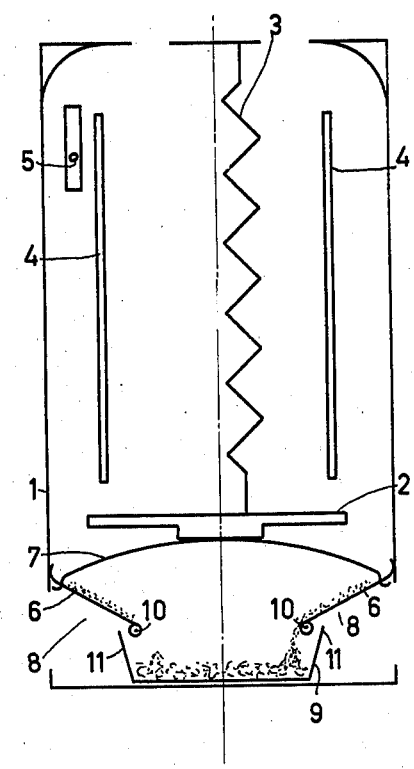

United States Patent [19]

Klijnstra

[11] 4,285,272
[45] Aug. 25, 1981

[54] TOASTER

[75] Inventor: Tiede Klijnstra, Groningen, Netherlands

[73] Assignee: U.S. Philips Corporation, New York, N.Y.

[21] Appl. No.: 55,842

[22] Filed: Jul. 9, 1979

[30] Foreign Application Priority Data

Jul. 12, 1978 [NL] Netherlands ............... 7807486

[51] Int. Cl.³ .............................................. A47J 37/08
[52] U.S. Cl. ....................................... 99/391; 99/400; 99/401
[58] Field of Search ................. 99/400, 337, 327, 328, 99/329 R, 338, 385, 389, 401, 326, 334, 335, 391, 393

[56] References Cited

U.S. PATENT DOCUMENTS

| 2,120,289 | 6/1938 | McCullough | 99/329 R |
| 2,196,394 | 4/1940 | Ireland | 99/329 R |
| 2,237,146 | 4/1941 | Ireland | 99/329 R |
| 2,339,183 | 1/1944 | Myers | 99/327 |
| 2,558,438 | 6/1951 | Humphrey | 99/329 R |

FOREIGN PATENT DOCUMENTS 1047397 12/1958 Fed. Rep. of Germany .
1852571 11/1961 Fed. Rep. of Germany .

Primary Examiner—Billy J. Wilhite
Attorney, Agent, or Firm—Thomas A. Briody; William J. Streeter; Rolf E. Schneider

[57] ABSTRACT

A toaster comprises a housing having a pair of heating elements for toasting a slice of bread. A pair of openings is provided in the bottom of the housing for the admission of air to effect cooling of the respective heating elements following a toasting cycle. A flap is associated with each opening for closing the same during the toasting cycle. A bread-slice support movable between a rest position and a toasting position effects closing of the flaps when it is moved into such toasting position.

3 Claims, 3 Drawing Figures

TOASTER

This invention relates to a toaster comprising heating elements for toasting bread and having at least one opening in the bottom of the toaster for the admission of cooling air.

Such a toaster is known from German Gebrauchsmuster No. 1,852,571. In this known toaster air slots are formed in the bottom of the toaster through which air is drawn in as a result of natural convection, which air flows along the base and cools it. The disadvantage of this system is that this air stream gives rise to an appreciable loss of heat.

It is the object of the present invention to provide a toaster in which the loss of heat during toasting is minimal.

To this end the toaster in accordance with the invention is characterized in that during toasting each opening can be closed by means of a flap. During toasting each opening is closed, so that no undesirable loss of heat occurs. An additional advantage is that after toasting the flap is opened and cooling air flows along the heating elements, so that the cooling of any thermosensitive element is accelerated and the toaster is directly ready for subsequent use.

A preferred embodiment of the toaster in accordance with the invention, said toaster being provided with a slide support which is movable between a rest position and a toasting position, is characterized in that in the toasting position each flap closes its opening under the influence of the slice support. In the rest position of the slice support, which is generally the uppermost position, each flap is then opened.

Suitably two flaps are provided in the bottom of the toaster, which are coupled to each other by means of a resilient element, which resilient element is depressible by the slice support so as to close the openings by the flaps.

A further embodiment of the toaster is characterized in that in the opened position each flap is disposed obliquely so as to discharge crumbs of bread into a crumb tray, which is known per se. The crumbs which have dropped onto the flaps during toasting drop onto the crumb tray during the upward movement. However a toaster provided with a crumb tray is known per se from for example German Patent No. 1,047,397.

Figure 2:
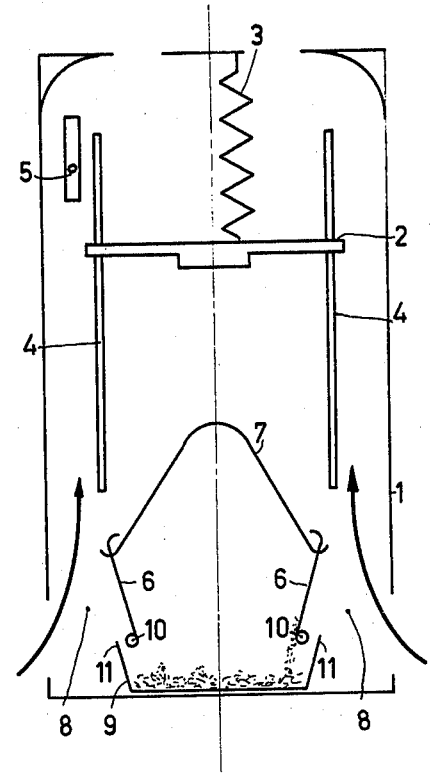
Figure 3:
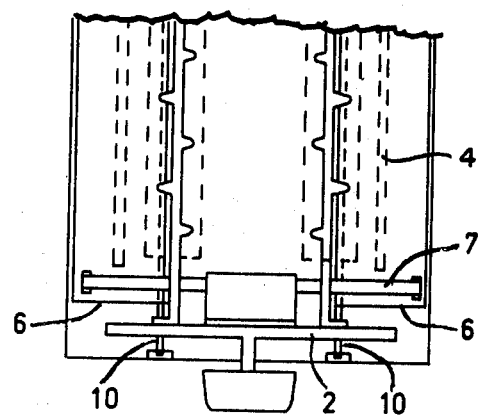

The invention will now be described in more detail with reference to the accompanying schematic drawings in which:

FIG. 1 shows the toaster in end view, the slice support being in the toasting position and the openings being closed by the flaps, FIG. 2 shows the toaster of FIG. 1, but with the slice support in the rest position and with the flaps opened, and FIG. 3 is a partial top plan view of the toaster of FIG. 1.

Reference numeral 1 designates the frame or housing of the toaster. A slice support 2 is movable upwards and downwards relative to the frame. A spring 3 is tensioned between the frame and the slice support. A mechanism, not shown, keeps the slice support in its lowermost position. Near the sides of the toaster there are arranged heating elements 4 for toasting bread in the lowermost position of the slice support. Furthermore, there is provided a thermo-sensitive element 5, which can exert a force on the mechanism, not shown, so as to unlatch the slice support. In the bottom of the toaster two flaps 6 are provided, which are connected to each other by means of a spring 7, for example a wire spring. These flaps are each adapted to close respective elongate openings 8. At the bottom of the toaster there is furthermore provided a crumb tray 9. The pivoting spindles 10 of the flaps 6 are situated within the edges 11 of the crumb tray.

FIG. 1, as indicated above, shows the slice support 2 in the toasting position. The spring 7 is thus pressed downwards by the slice support so that the flaps 6 close the openings 8. After the thermo-sensitive element 5 has unlatched the slice support 2 via the previously indicated unshown mechanism, the slice support moves upwards to the rest position under the influence of the spring 3. The spring 7 is thus released, the flaps 6 being pivoted upwards. The openings 8 are opened and as a result of natural convection the heating elements 4 and the thremo-sensitive element 5 are cooled rapidly, so that the appliance can be switched on again immediately. When the flaps are tilted upwards crumbs which have dropped onto said flaps can be caught in the crumb tray 9.

What is claimed is:

1. A toaster for slices of bread or the like, which comprises a housing; at least one heating element in said housing for respectively toasting one or more bread slices; an opening in the bottom of the housing adjacent each heating element for the passage of air over said heating element to cool the same following a toasting cycle; a flap associated with each opening and movable between an open position and a closed position for closing the opening during the toasting cycle; means engaging the flaps for effecting movement of the same between their open position and their closed position; a support for said one or more bread slices movable between a rest position and a toasting position, said slice support when moved to said toasting position contacting said flap-engaging means to effect closing of the flaps; and means to move said slice support to and to maintain the same in said toasting position during the toasting cycle.

2. A toaster according to claim 1, in which the flap-engaging means comprises a resilient element coupling said flaps together, said resilient element being depressible by the slice support upon movement of the latter to its toasting position for moving said flaps into their closed position.

3. A toaster according to claim 1 or 2, which includes a crumb tray, each flap in its open position being disposed to discharge any crumbs accumulated thereon into said crumb tray.

* * * * *